United States Patent
Aksu et al.

(10) Patent No.: US 11,723,061 B2
(45) Date of Patent: *Aug. 8, 2023

(54) METHOD AND SYSTEM FOR SCHEDULING DATA TRANSMISSIONS BASED ON PRIORITY VALUE AND RADIO ACCESS NETWORK SLICE WEIGHT

(71) Applicant: Verizon Patent and Licensing Inc., Basking Ridge, NJ (US)

(72) Inventors: Arda Aksu, Lafayette, CA (US); Jin Yang, Orinda, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/466,067

(22) Filed: Sep. 3, 2021

(65) Prior Publication Data

US 2021/0400686 A1    Dec. 23, 2021

Related U.S. Application Data

(63) Continuation of application No. 16/422,167, filed on May 24, 2019, now Pat. No. 11,147,089.

(51) Int. Cl.
| | |
|---|---|
| *H04W 72/12* | (2023.01) |
| *H04W 72/566* | (2023.01) |
| *H04W 72/1273* | (2023.01) |
| *H04W 72/52* | (2023.01) |
| *H04W 72/50* | (2023.01) |
| *H04W 72/542* | (2023.01) |
| *H04W 72/543* | (2023.01) |

(52) U.S. Cl.
CPC ...... *H04W 72/566* (2023.01); *H04W 72/1273* (2013.01); *H04W 72/52* (2023.01); *H04W 72/535* (2023.01); *H04W 72/542* (2023.01); *H04W 72/543* (2023.01)

(58) Field of Classification Search
CPC ......... H04W 72/1231; H04W 72/1236; H04W 72/1247; H04W 72/1252; H04W 72/1257; H04W 72/1273
See application file for complete search history.

(56) References Cited

U.S. PATENT DOCUMENTS

| | | | |
|---|---|---|---|
| 8,185,127 | B1 | 5/2012 | Cai et al. |
| 11,147,089 | B2 * | 10/2021 | Aksu ................. H04W 72/1236 |
| 2003/0067897 | A1 | 4/2003 | Black |
| 2016/0212757 | A1 | 7/2016 | Jung et al. |
| 2020/0145799 | A1 | 5/2020 | Baghel et al. |

* cited by examiner

*Primary Examiner* — Melvin C Marcelo
*Assistant Examiner* — Natali Pascual Peguero

(57) ABSTRACT

A method, a device, and a non-transitory storage medium are described in which an scheduling service is provided. The scheduling service includes calculation of a priority value, on a per end device basis, based on throughput information and tuning parameter values. The priority value may also be calculated based on a radio access network slice weight. The scheduling service may calculate a schedule for transmission of data to an end device based on the priority value, available network resources, and a quality of service profile associated with a quality of service flow of the end device.

20 Claims, 8 Drawing Sheets

METHOD AND SYSTEM FOR SCHEDULING DATA TRANSMISSIONS BASED ON PRIORITY VALUE AND RADIO ACCESS NETWORK SLICE WEIGHT

CROSS REFERENCE TO RELATED APPLICATION

This patent application is a continuation of U.S. patent application Ser. No. 16/422,167, entitled "METHOD AND SYSTEM FOR SCHEDULING DATA TRANSMISSIONS BASED ON PRIORITY VALUE AND RADIO ACCESS NETWORK SLICE WEIGHT" and filed on May 24, 2019, the disclosure of which is incorporated herein by reference in its entirety.

BACKGROUND

Development and design of radio access networks (RAN) and core networks present certain challenges from a network-side perspective and an end device perspective. For example, depending on the configurations from both network-side and end device-side perspectives, such configurations may reduce the effective use of resources. Accordingly, a need exists to overcome these challenges.

DETAILED DESCRIPTION OF PREFERRED EMBODIMENTS

Figure 1:
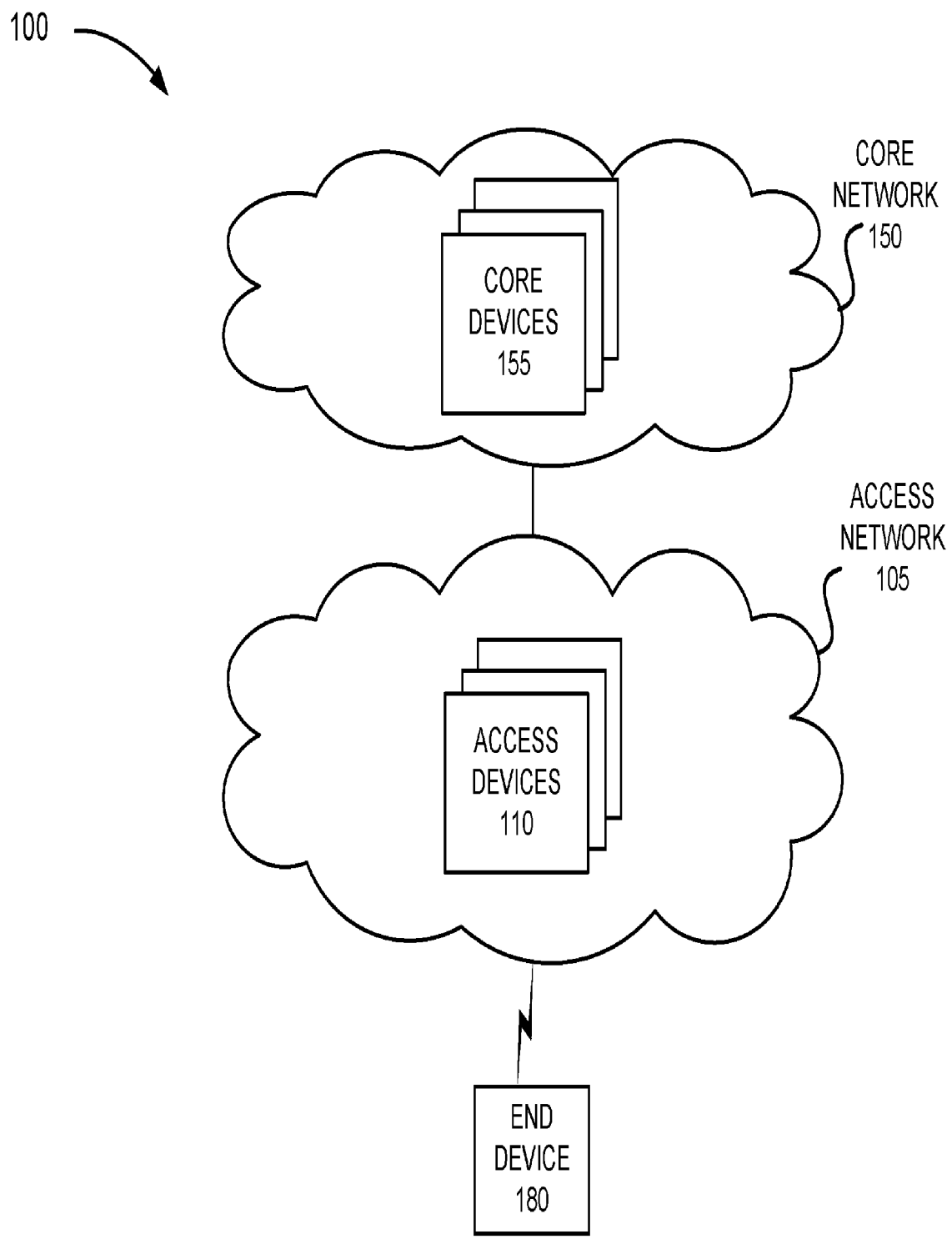
FIG. 1 is a diagram illustrating an exemplary environment in which an exemplary embodiment of a scheduling service may be implemented.

The following detailed description refers to the accompanying drawings. The same reference numbers in different drawings may identify the same or similar elements. Also, the following detailed description does not limit the invention.

A next generation or future wireless network should support various use cases, meet various performance metrics, allow for scalability and flexibility, and so forth. One approach to meet such criteria is to use network slicing from end-to-end (e.g., from a radio access network (RAN) through a core network (CN)). Network slicing of the RAN and CN may enable each use case or end device request to be served by a "network slice" (e.g., physical resources, logical resources, virtual resources, radio, etc.) of the network. The RAN and the CN may include various network functions, each of which may be sliced. According to various implementations, a network function may support one or multiple network slices.

Within the network slice, an end device may have one or multiple quality of service (QoS) flows. For example, in a Fifth Generation (5G) network, the QoS profile may include 5G QoS Identifiers (5QIs) and allocation and retention priority (ARP) parameters. The 5QI value may define or correlate to various 5G QoS characteristics, such as a default priority level, a packet error rate, a packet delay budget, etc, as well as correlate to a resource type (e.g., guaranteed bit rate (GBR), a non-GBR, etc.). The 5QI value and corresponding 5G QoS characteristics may control QoS forwarding treatment for a QoS flow, such as scheduling weights, admission thresholds, queue management thresholds, link layer protocol configuration, etc. A next generation Node B (gNB) of the 5G network may map 5G QoS flows to one or multiple data radio bearers (DRBs) on a radio interface, for example.

Current approaches for RAN slicing may use 5QI-to-5QoS mapping and physical and Media Access Control (MAC) layer settings for scheduling of resources for data transmissions. However, such scheduling does not account for differences among end devices and their associated radio conditions. This can result in unfair scheduling for end devices and/or waste of network resources. For example, end devices of a same RAN slice may be scheduled the same (e.g., in terms of amount of resources allocated, duration and/or data amount of transmission, etc.) despite differences in actual radio conditions among the end devices. Also, for example, such scheduling does not account for historical performance of transmissions on a per end device basis. In this regard, end devices that may have less favorable radio conditions in relation to previous transmissions relative to other end devices, may suffer from service degradation even when subsequent transmissions may yield more favorable service.

According to exemplary embodiments, a scheduling service is described. According to an exemplary embodiment, the scheduling service includes scheduling resources for communication between a RAN device and an end device based on a priority value. According to an exemplary embodiment, the scheduling service may be used in a RAN slice environment. According to other exemplary embodiments, the scheduling service may be used in a non-RAN slice environment. According to exemplary embodiments, the priority value is calculated for each end device.

According to an exemplary embodiment, in a RAN slice environment, the priority value is calculated based on an instantaneous throughput value and an average throughput value of an end device, and a RAN slice weight value of a RAN slice associated with the end device. According to an exemplary embodiment, the throughput values may be tuned based on tuning parameter values, as described herein. According to another exemplary embodiment, in a non-RAN slice environment, the priority value is calculated based on an instantaneous throughput value and an average throughput value of the end device, and the tuning parameter values, as described herein. According to exemplary embodiments, the tuning parameter values may be static or dynamic, as described herein. According to an exemplary embodiment, the tuning parameters may be different among different cells/sectors, wireless service areas (e.g., urban/dense areas versus sparse areas, etc.), or another type of attribute of a geographic area from which the end device obtains wireless service.

As a result, the scheduling service may improve network resource utilization in a network. For example, the scheduling service may improve the use of various network resources (e.g., physical, logical, virtual, radio) in relation to network devices of a RAN or network devices of the RAN and a core network that may stem from unnecessary signaling. Additionally, the scheduling service may improve resource utilization and quality of service at the end device for similar reasons, as well as save battery power.

FIG. 1 is a diagram illustrating an exemplary environment 100 in which an exemplary embodiment of the scheduling service may be implemented. As illustrated, environment 100 includes an access network 105 and a core network 150. Access network 105 includes access devices 110, and core network 150 includes core devices 155. Environment 100 further includes an end device 180.

The number, the type, and the arrangement of network devices in access network 105 and core network 150, as illustrated and described, are exemplary. The number of end devices 180 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., SDN, virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the network devices, and between end device 180 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the scheduling service may use at least one of these planes of communication.

Access network 105 may include one or multiple networks of multiple types and technologies. For example, access network 105 may include a Fourth Generation (4G) RAN, a 4.5G RAN, a Fifth Generation (5G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, and a next generation (NG) RAN. Access network 105 may further include other types of wireless networks, such as a WiFi network, a Worldwide Interoperability for Microwave Access (WiMAX) network, a local area network (LAN), or another type of network (e.g., a legacy Third Generation (3G) RAN, etc.) that may provide an on-ramp to access devices 110 and/or core network 150.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., RATs, etc.), wireless standards, wireless frequencies/bands/carriers, licensed radio spectrum, unlicensed radio spectrum, and/or other attributes of radio communication.

Access network 105 may include different and multiple functional splitting, such as options 1, 2, 3, 4, 5, 6, 7, or 8 that relate to combinations of access network 105 and core network 150 including an Evolved Packet Core (EPC) network and/or a NG core (NGC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

Depending on the implementation, access network 105 may include one or multiple types of network devices, such as access devices 110. For example, access devices 110 may include an eNB, a gNB, an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node. According to an exemplary embodiment, access device 110 includes logic that provides the scheduling service, as described herein.

Core network 150 may include multiple networks of multiple types and technologies. According to an exemplary embodiment, core network 150 includes a complementary network of access network 105. For example, core network 150 may be implemented to include a core network of an LTE, LTE-A network, and/or an LTE-A Pro network, a next generation core (NGC) network and/or another type of future generation core network. Core network 150 may include a legacy core network.

Depending on the implementation, core network 150 may include various types of network devices, such as core devices 155. For example, core devices 155 may include a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a mobility management entity (MME), a session management function (SMF), a unified data management (UDM) device, an authentication server function (AUSF), a network slice selection function (NSSF), a network repository function (NRF), a policy control function (PCF), a network exposure function (NEF), and/or an application function (AF). According to other exemplary implementations, core devices 155 may include additional, different, and/or fewer network devices than those described. For example, core devices 155 may include a non-standard and/or proprietary network device. According to an exemplary embodiment, core device 155 includes logic that provides the scheduling service, as described herein.

End device 180 includes a device that has computational and wireless communication capabilities. Depending on the implementation, end device 180 may be a mobile device, a portable device, a stationary device, a device operated by a user, or a device not operated by a user. For example, end device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or other types of wireless end nodes. By way of further example, end device 180 may be implemented as a smartphone, a personal digital assistant, a tablet, a netbook, a phablet, a wearable device (e.g., a watch, glasses, etc.), a set top box, an infotainment system in a vehicle, a vehicle support system, a smart television, a game system, a music playing system, or other types of wireless end devices. End device 180 may be configured to execute various types of software (e.g., applications, programs, etc.). The number and the types of software may vary among end devices 180.

End device 180 may support one or multiple RATs (e.g., 4G, 5G, etc.) and various portions of the radio spectrum (e.g., multiple frequency bands, multiple carrier frequencies, licensed, unlicensed, etc.), network slicing, DC service, and/or other types of connectivity services. Additionally, end device 180 may include one or multiple communication interfaces that provide one or multiple (e.g., simultaneous) connections via the same or different RATs, frequency bands, carriers, network slices, and so forth. The multimode capabilities of end device 180 may vary among end devices 180.

Figure 2:
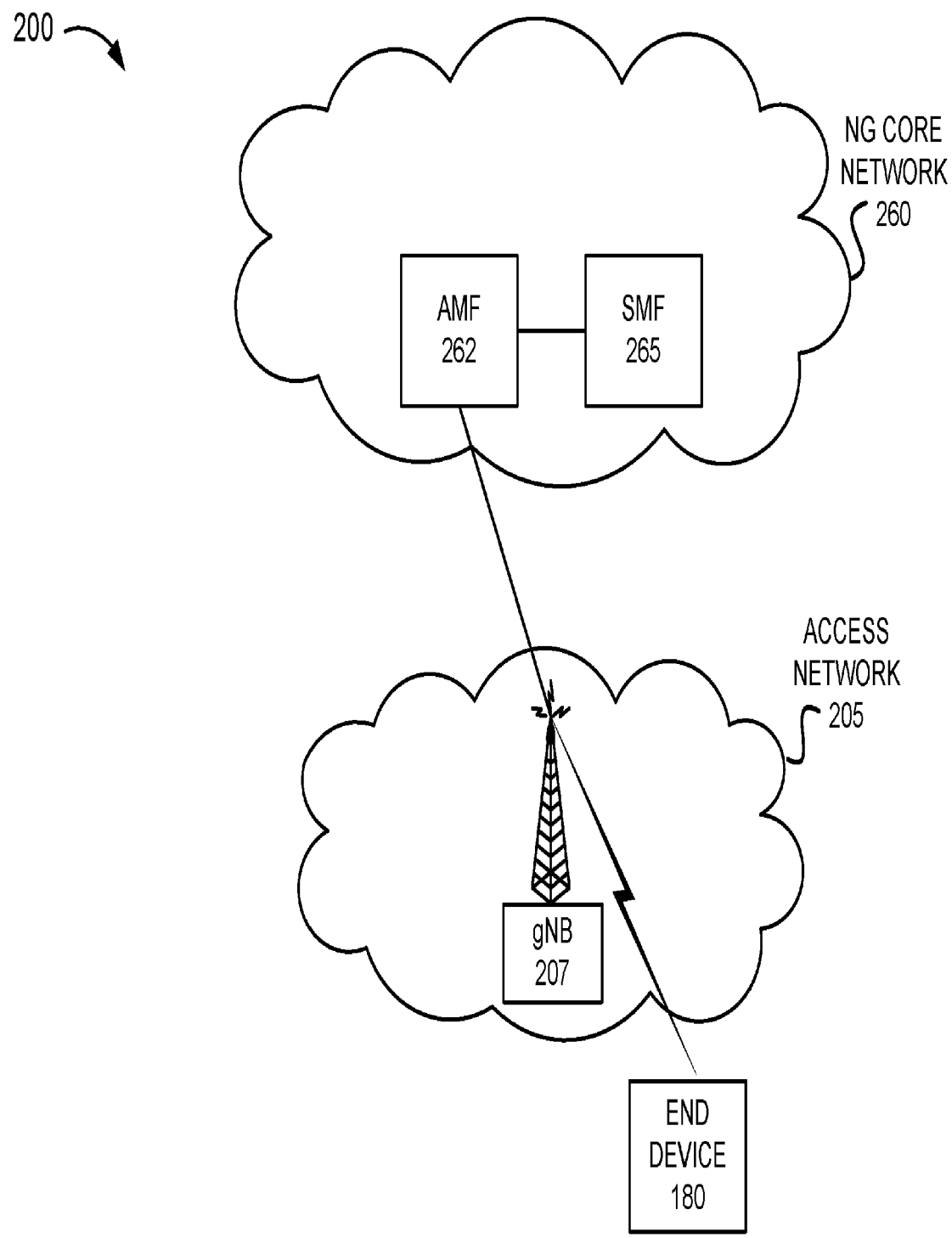
FIG. 2 is a diagram illustrating another exemplary environment in which an exemplary embodiment of the scheduling service may be implemented.

FIG. 2 is a diagram illustrating an exemplary environment 200 in which an exemplary embodiment of the scheduling service may be implemented. As illustrated, environment 200 includes an access network 205 and a NG core network 260. Access network 205 includes a gNB 207. NG core network 260 includes an AMF 262 and an SMF 265. As previously described in relation to environment 100, the number of network devices, the type of network devices, the communication links, and so forth, in environment 200 are exemplary.

Figure 3A:
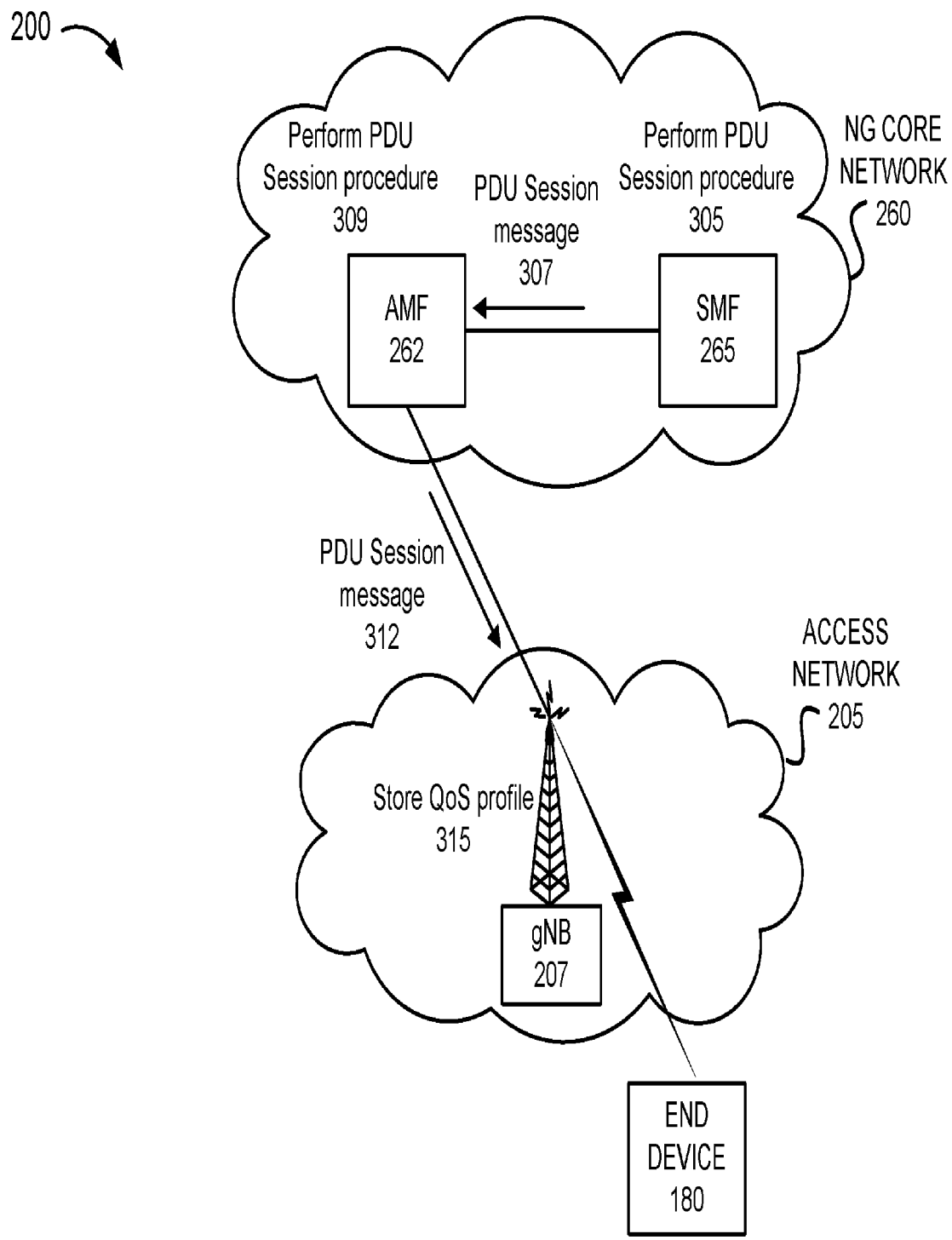
FIGS. 3A-3D are diagrams illustrating an exemplary process of an exemplary embodiment of the scheduling service.

FIGS. 3A-3D are diagrams illustrating an exemplary process of an exemplary embodiment of the scheduling service. Referring to FIG. 3A, according to an exemplary scenario, SMF 265 may perform a packet data unit (PDU) session procedure 305. The PDU session procedure may include binding a service data flow (SDF) to a 5G QoS flow based on QoS and service requirements. The PDU session procedure may also include assigning a QoS Flow Identifier (QFI) to the QoS flow and deriving a QoS profile. The QoS profile may identify the 5G QoS characteristics with a 5G QoS Identifier (5QI) and ARP parameters. The PDU session procedure may further include transmitting a PDU session message 307 to AMF 262. The PDU session message may include the QoS profile. In turn, based on the receipt of the PDU session message from SMF 265, AMF 262 may perform a PDU session procedure 309, which includes transmitting a PDU session message 312 to gNB 207. The PDU session message may include the QoS profile. As illustrated, based on the receipt of the PDU session message from AMF 262, gNB 207 may store the QoS profile 315. In this way, gNB 207 may apply the QoS profile to the 5G QoS flow. According to other exemplary scenarios, the QoS profile may not be provided to gNB 207 from NG core network 260. For example, access device 110 (e.g., gNB 207) may be pre-configured with the QoS profile.

Figure 3B:
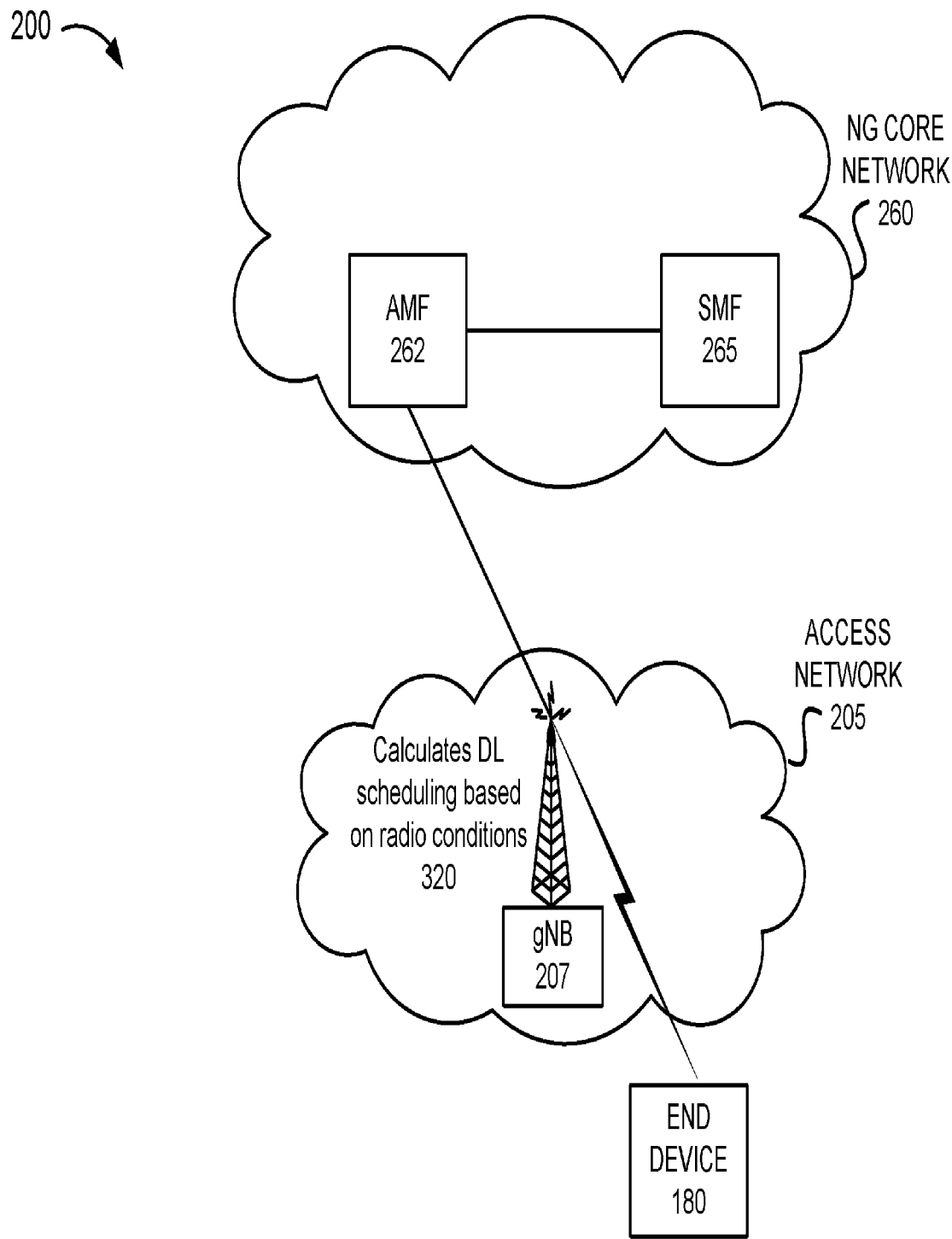

Referring to FIG. 3B, subsequent to storing the QoS profile, gNB 207 may calculate a priority value for each end device 180 based on the radio conditions pertaining to end device 180. According to an exemplary embodiment, a priority value P may be calculated based on the following exemplary expression:

$$P = \frac{T^{\alpha}}{R^{\beta}}, \quad (1)$$

in which T indicates an instantaneous throughput of end device 180, R indicates an average throughput of end device 180, and $\alpha$ and $\beta$ are values that may be used to tune the ratio. For example, the values of T and R may relate to a previous transmission of data between gNB 207 and end device 180. The time window used to calculate the average throughput is configurable. Additionally, the tuning parameter values of $\alpha$ and $\beta$ may be 0, 1 or between 0 and 1. By way of further example, when $\alpha=0$ and $\beta=1$, a round-robin scheduling may be attained in which the value of P is 1/average throughput. In contrast, according to another example, when $\alpha=1$ and $\beta=0$, the value of P is the instantaneous throughput of end device 180. According to still other examples, values between 0 and 1 may be assigned to $\alpha$ and $\beta$, and correspondingly other types of scheduling arrangements may be configured. As previously described, the values of $\alpha$ and $\beta$ may differ between different cells, sectors, wireless service areas, or in relation to other types of information (e.g., between different 5QI values, different end device applications, etc.). Additionally, the values of $\alpha$ and $\beta$ may be dynamically adjusted based on time of day, congestion level at access device 110, or other types of context information. According to some exemplary embodiments, the tuning parameter values of $\alpha$ and $\beta$ are different (e.g., $\alpha=0$ and $\beta\neq 0$). According to an exemplary embodiment, the priority value P may be calculated for scheduling downlink transmissions of best effort traffic to end device 180.

According to another exemplary embodiment, a priority value P' may be calculated based on the following exemplary expression:

$$P' = w \frac{T^{\alpha}}{R^{\beta}}, \quad (2)$$

in which w indicates a RAN slice weight for a RAN slice, T indicates an instantaneous data rate of end device 180, R indicates a filtered data throughput of end device 180, and $\alpha$ and $\beta$ are values that may be used to tune the ratio value. The RAN slice weight w may indicate a priority for a RAN slice, and different RAN slices may be assigned different and/or the same values of w that may enable lower or higher priority for packets of different RAN slices. In this regard, end devices 180 of the same RAN slice may be differentiated based on the priority value P' (e.g., values T, R, $\alpha$ and $\beta$). Similarly, the priority value P' may be calculated for scheduling downlink transmissions of best effort traffic to end device 180. According to some exemplary embodiments, the priority value may be calculated for only best effort traffic.

Figure 3C:
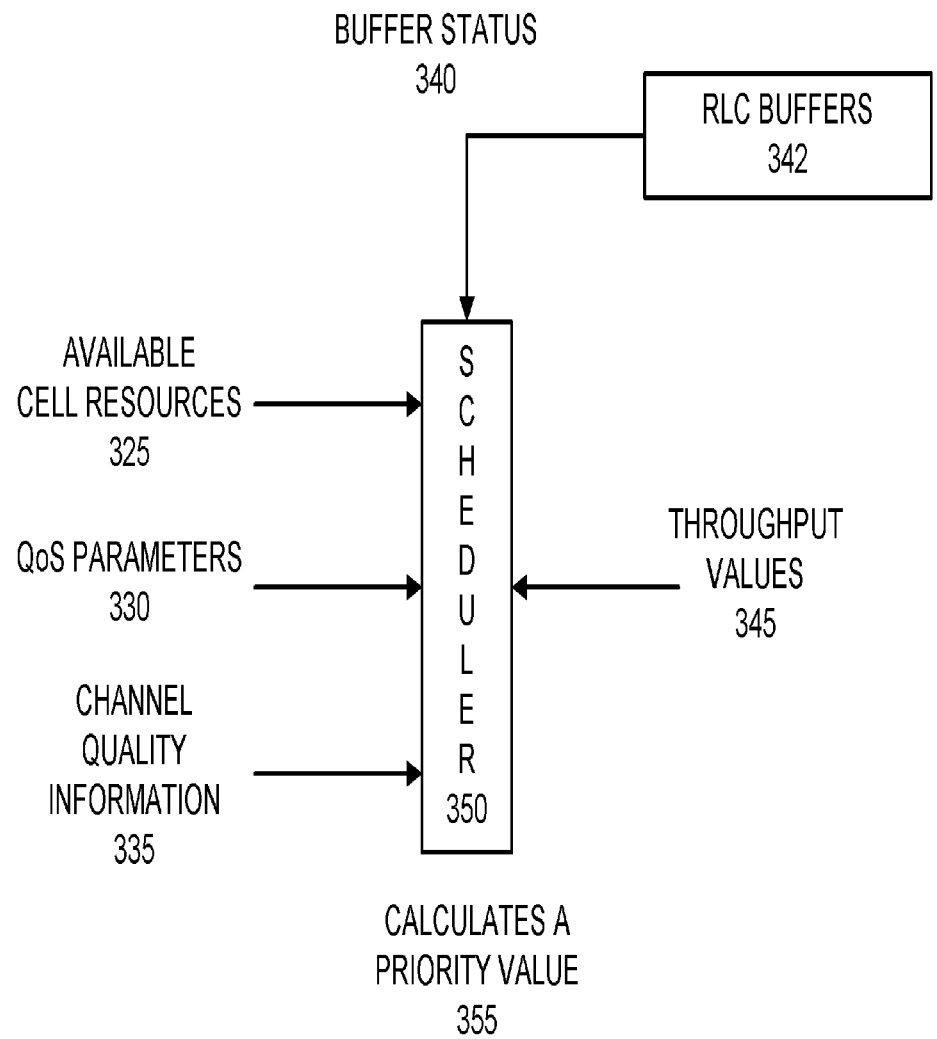

Referring to FIG. 3C, according to an exemplary embodiment, gNB 207 may include a scheduler 350 that calculates the priority value. For example, according to an exemplary implementation, scheduler 350 may be included in a BBU of gNB 207. Additionally, or alternatively, for example, scheduler 350 may be included in a function of a split option, such as a central unit (CU), a distributed unit (DU), a remote unit (RU or a remote radio unit (RRU)), or another type of split option arrangement, such as an RU and DU integration, or another type of functional split option.

Scheduler 350 may use the priority value as a basis for scheduling traffic. Scheduler 350 may also perform other functions, such as transport-format selection (e.g., transport block size, modulation scheme, antenna mapping, etc.), logical channel multiplexing for transmissions, etc., along with management of which end devices 180 to transmit to/receive from.

As further illustrated in FIG. 3C, scheduler 350 may obtain various types of information. According to an exemplary embodiment, scheduler 350 may obtain available cell resources 325, QoS parameters 330, channel quality information 335, buffer status 340, and throughput values 345. According to other exemplary embodiments, scheduler 350 may obtain additional, different, and/or fewer types of information.

Available cell resources 325 may include information indicating available network resources (e.g., physical, logical, virtual, and/or radio). QoS parameters 330 may include information indicating QoS parameters included in the QoS profile pertaining to end device 180. For example, the QoS parameters may include packet delay budget, packet error rate, default maximum data burst volume, default averaging window, default priority level, and/or other types of QoS parameters that may be mapped to a 5QI value pertaining to a QoS flow of end device 180. Channel quality information 335 may include information indicating a Reference Signal Receive Power (RSRP), a Received Signal Strength Indicator (RSSI), a Reference Signal Received Quality (RSRQ), a signal-to-noise ratio (SNR), a signal-to-interference-plus-noise ratio (SINR), and/or another type of channel condition value. The channel quality information may be received from end device 180 and relate to a downlink radio bearer.

Buffer status 340 may include information indicating the amount of data in a buffer of gNB 207. For example, buffer status 340 may relate to a radio link control (RLC) buffer 342 or another layer buffer. The amount of data in the buffer may be the amount of data associated with a QoS flow for end device 180. According to other examples, buffer status 340 may relate to the QoS flow and a RAN slice associated with end device 180. Throughput values 345 may indicate historical instantaneous and average throughput values for end device 180. gNB 207 or a component of gNB 207 (e.g., DU of gNB 207, etc.) (not shown) may measure and calculate the throughput values for each end device 180, and provide the throughput values to scheduler 350. According to an exemplary embodiment, the average throughput value may relate to one or multiple previous transmissions, while the instantaneous throughput value may relate to the most recent transmission.

Scheduler 350 may calculate a priority value 355 based on expression (1) or expression (2), as described herein, in relation to end device 180. For example, according to an exemplary scenario, assume that gNB 207 has data to transmit in a downlink to end device 180. gNB 207 may calculate an instantaneous throughput value for end device 180 (e.g., 7) and an average throughput value, in view of a configured time window, for end device 180 (e.g., R). Based on these values and the $\alpha$ and $\beta$ values, scheduler 350 may calculate the value P according to expression (1). According to another exemplary scenario in which a RAN slice is used for transmission, scheduler 350 may calculate the value P' according to expression (2) in which a RAN slice weight w is used.

Figure 3D:
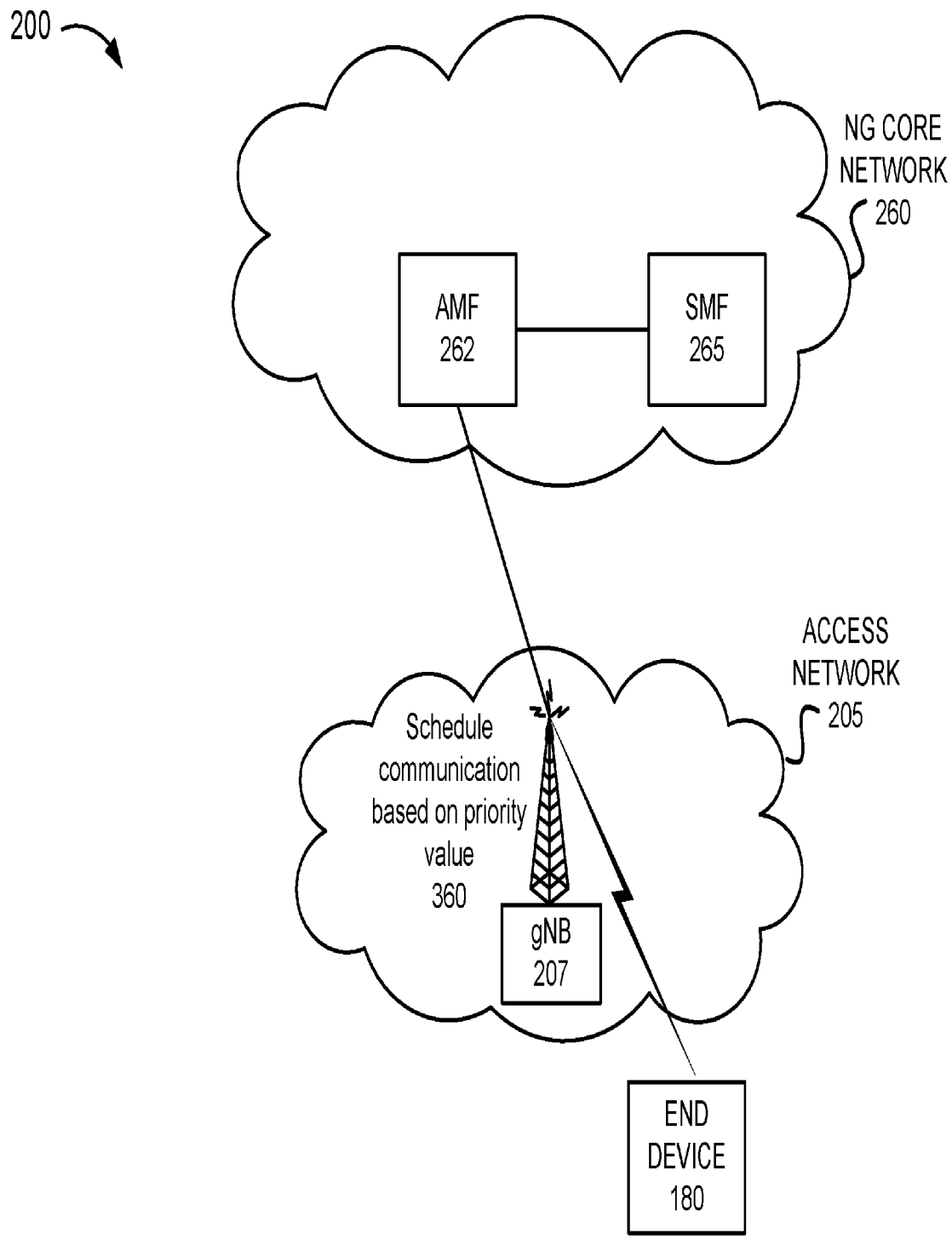

Referring to FIG. 3D, gNB 207 may schedule a communication based on the calculated priority value 360. For example, according to an exemplary scenario, scheduler 350 may schedule the downlink transmission of data to end device 180 based on the calculated priority value. Scheduler 350 may also use the available cell resource information, the QoS parameter information, the buffer status information, and/or the channel quality information for calculation of the schedule. Although not illustrated, gNB 207 may transmit the data to end device 180 based on the schedule.

FIGS. 3A-3D illustrate an exemplary process of the scheduling service, however, according to other exemplary embodiments, the process may include additional, different, and/or fewer steps, and/or include additional, different, and/or fewer messages. For example, according to other exemplary embodiments, the priority value may be calculated for scheduling other types of transmissions (e.g., uplink, etc.) and/or other types of traffic (e.g., voice, mission critical, not best effort, etc.). Additionally, for example, according to other exemplary embodiments, the priority value P may be calculated by an eNB or a component of the eNB, and used as a basis for scheduling a data transmission to end device 180.

Figure 4:
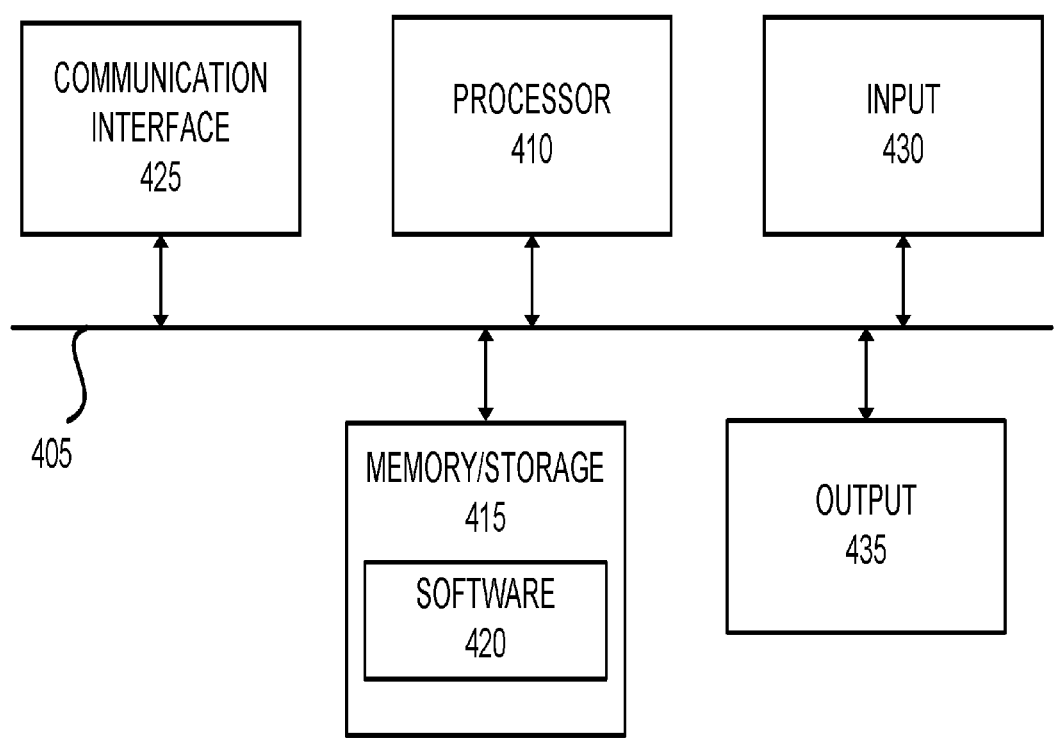
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to components included in access devices 110, core devices 155, end device 180, gNB 207, AMF 262, SMF 265, and/or other devices described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with respect to access device 110 (e.g., gNB 207, etc.), software 420 may include an application that, when executed by processor 410, provides a function of the scheduling service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, terminated, or undergo a life-cycle, using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process and/or a function, as described herein, based on the execution of hardware (processor 410, etc.).

Figure 5:
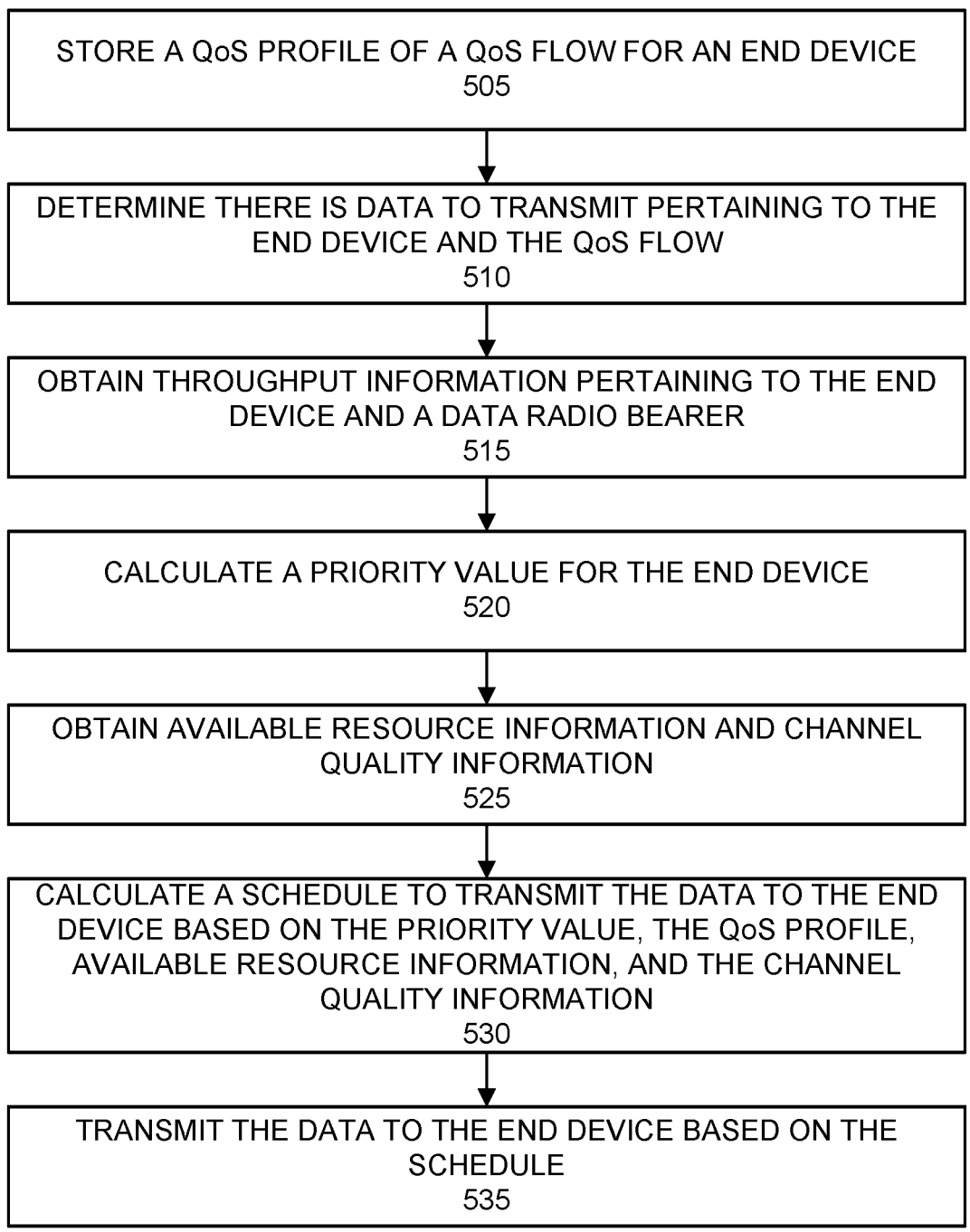
FIG. 5 is a flow diagram illustrating an exemplary process of an exemplary embodiment of the scheduling service.

FIG. 5 is a flow diagram illustrating an exemplary process 500 of an exemplary embodiment of the scheduling service. According to an exemplary embodiment, access device 110 (or a component of access device 110) of access network 105 performs steps of process 500. For example, access device 110 may be gNB 207 or a component of gNB 207 (e.g., a BBU, a DU, a scheduler, etc.). Additionally, for example, processor 410 may execute software 420 to perform a step illustrated in FIG. 5 and described herein. Additionally, or alternatively, a step illustrated in FIG. 5 may be performed by execution of only hardware.

In block 505, a QoS profile of a QoS flow for an end device may be stored. For example, access device 110 may receive the QoS profile from core device 155 and store the QoS profile. Alternatively, access device 110 may be pre-configured with the QoS profile. The QoS profile may apply to a QoS flow of end device 180.

In block 510, data to transmit pertaining to the end device and the QoS flow may be determined. For example, access device 110 may determine that there is data of the QoS flow to transmit to end device 180 based on buffer status information, as previously described.

In block 515, throughput information pertaining to the end device and a data radio bearer may be obtained. For example, access device 110 may calculate and obtain an instantaneous throughput value and an average throughput value relating to end device 180. The throughput values may pertain to a previous transmission of data to end device 180.

In block 520, a priority value may be calculated. For example, access device 110 may calculate the priority value. By way of further example, when the data radio bearer with end device 180 does not relate to a RAN slice, access device 110 may calculate a priority value P based on expression (1), as described herein. Alternatively, for example, when the data radio bearer with end device 180 does relate to RAN slice, access device 110 may calculate a priority value P' based on expression (2), as described herein.

In block 525, available resource information and channel quality information may be obtained. For example, access device 110 may generate information indicating the available resources (e.g., physical, logical, virtual, radio) at access device 110 and/or in relation to a data radio bearer to be used for communication with end device 180. Additionally, access device 110 may obtain channel quality information from end device 180, as previously described.

In block 530, a schedule to transmit the data to the end device based on the priority value, the QoS profile, available resource information, and channel quality information may be calculated. For example, access device 110 may use the priority value P or P', the QoS profile, the available resource information, and the channel quality information, as a basis for scheduling the transmission. By way of further example, the schedule for end device 180 may yield more or less data to be transmitted and/or certain packets to be transmitted or not relative to other transmissions for other end devices 180 depending on various parameters associated with the transmission (e.g., number of radio resource blocks allocated, duration of the transmission, etc.), the priority value, the QoS profile associated with the QoS flow, and the channel quality information of end device 180.

In block 535, the data may be transmitted to the end device based on the schedule. For example, access device 110 may transmit the data of the QoS flow to end device 180 in accordance with the schedule.

FIG. 5 illustrates an exemplary process 500 of the scheduling service, however, according to other embodiments, process 500 may include additional operations, fewer operations, and/or different operations than those illustrated in FIG. 5, and described herein. For example, in block 510, access device 110 may determine whether the data is subject to the scheduling service. By way of further example, access device 110 may determine whether the data is best effort data and/or whether the data relates to the downlink or the uplink.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to processes illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
obtaining, by a network device of a radio access network, an instantaneous throughput value and an average throughput value of an end device pertaining to a previous downlink communication from the network device to the end device via a data radio bearer;
calculating, by the network device, a priority value based on a ratio of the instantaneous throughput value and the average throughput value; and
generating, by the network device, a schedule to transmit data to the end device based on a quality of service (QoS) profile and the priority value.

2. The method of claim 1, wherein the data radio bearer is included in a radio access network slice, and the calculating further comprising:
calculating, by the network device, the priority value based on the ratio of the instantaneous throughput value and the average throughput value, and a weight factor of the radio access network slice.

3. The method of claim 1, wherein the priority value is further calculated based on a first parameter value that is applied to the instantaneous throughput value and a second parameter value that is applied to the average throughput value.

4. The method of claim 3, wherein the first parameter value and the second parameter value are dynamic values.

5. The method of claim 1, further comprising:
obtaining, by the network device from the end device, channel quality information that includes one or more of a Reference Signal Receive Power (RSRP), a Received Signal Strength Indicator (RSSI), or a signal-to-noise ratio (SNR), and wherein the generating further comprising:
generating, by the network device, the schedule to transmit the data to the end device based on the QoS profile, the priority value, and the channel quality information.

6. The method of claim 1, further comprising:
transmitting, by the network device to the end device, the data based on the schedule.

7. The method of claim 1, wherein the QoS profile includes a Fifth Generation QoS Identifier that indicates Fifth Generation QoS parameters, and the Fifth Generation QoS parameters include a default priority level.

8. The method of claim 1, wherein the network device is a next generation Node B (gNB).

9. A network device comprising:
a processor configured to:
obtain an instantaneous throughput value and an average throughput value of an end device pertaining to a previous downlink communication from the network device to the end device via a data radio bearer, wherein the network device is of a radio access network;
calculate a priority value based on a ratio of the instantaneous throughput value and the average throughput value; and
generate a schedule to transmit data to the end device based on a quality of service (QoS) profile and the priority value.

10. The network device of claim 9, wherein the data radio bearer is included in a radio access network slice, and wherein, when calculating, the processor is further configured to:
calculate the priority value based on the ratio of the instantaneous throughput value and the average throughput value, and a weight factor of the radio access network slice.

11. The network device of claim 9, wherein the priority value is further calculated based on a first parameter value that is applied to the instantaneous throughput value and a second parameter value that is applied to the average throughput value.

12. The network device of claim 11, wherein the first parameter value and the second parameter value are dynamic values.

13. The network device of claim 9, wherein the processor is further configured to:
obtain, from the end device, channel quality information that includes one or more of a Reference Signal Receive Power (RSRP), a Received Signal Strength Indicator (RSSI), or a signal-to-noise ratio (SNR), and wherein, when generating, the processor is further configured to:
generate the schedule to transmit the data to the end device based on the QoS profile, the priority value, and the channel quality information.

14. The network device of claim 9, wherein the processor is further configured to:
transmit, to the end device, the data based on the schedule.

15. The network device of claim 9, wherein the QoS profile includes a Fifth Generation QoS Identifier that indicates Fifth Generation QoS parameters, and the Fifth Generation QoS parameters include a default priority level.

16. The network device of claim 9, wherein the network device is a next generation Node B (gNB).

17. A non-transitory computer-readable storage medium storing instructions executable by a processor of a network device of a radio access network, which when executed cause the network device to:
obtain an instantaneous throughput value and an average throughput value of an end device pertaining to a previous downlink communication from the network device to the end device via a data radio bearer;
calculate a priority value based on a ratio of the instantaneous throughput value and the average throughput value; and
generate a schedule to transmit data to the end device based on a quality of service (QoS) profile and the priority value.

18. The non-transitory computer-readable storage medium of claim 17, wherein the data radio bearer is included in a radio access network slice, and wherein the instructions to calculate further comprise instructions, which when executed cause the network device to:
calculate the priority value based on the ratio of the instantaneous throughput value and the average throughput value, and a weight factor of the radio access network slice.

19. The non-transitory computer-readable storage medium of claim 17, wherein the priority value is further calculated based on a first parameter value that is applied to the instantaneous throughput value and a second parameter value that is applied to the average throughput value.

20. The non-transitory computer-readable storage medium of claim 19, wherein the first parameter value and the second parameter value are dynamic values.

* * * * *